United States Patent
Ferris et al.

(10) Patent No.: US 9,437,231 B1
(45) Date of Patent: Sep. 6, 2016

(54) DATA STORAGE DEVICE CONCURRENTLY CONTROLLING AND SENSING A SECONDARY ACTUATOR FOR ACTUATING A HEAD OVER A DISK

(71) Applicant: Western Digital Technologies, Inc., Irvine, CA (US)

(72) Inventors: Timothy A. Ferris, Mission Viejo, CA (US); Jaesoo Byoun, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/865,858

(22) Filed: Sep. 25, 2015

(51) Int. Cl.
 *G11B 5/55* (2006.01)

(52) U.S. Cl.
 CPC .......... *G11B 5/5565* (2013.01); *G11B 5/5526* (2013.01)

(58) Field of Classification Search
 None
 See application file for complete search history.

(56) References Cited

U.S. PATENT DOCUMENTS

| | | |
|---|---|---|
| 6,014,283 A | 1/2000 | Codilian et al. |
| 6,052,076 A | 4/2000 | Patton, III et al. |
| 6,052,250 A | 4/2000 | Golowka et al. |
| 6,067,206 A | 5/2000 | Hull et al. |
| 6,078,453 A | 6/2000 | Dziallo et al. |
| 6,091,564 A | 7/2000 | Codilian et al. |
| 6,094,020 A | 7/2000 | Goretzki et al. |
| 6,100,623 A | 8/2000 | Huang et al. |
| 6,101,065 A | 8/2000 | Alfred et al. |
| 6,104,153 A | 8/2000 | Codilian et al. |
| 6,122,133 A | 9/2000 | Nazarian et al. |
| 6,122,135 A | 9/2000 | Stich |
| 6,141,175 A | 10/2000 | Nazarian et al. |
| 6,160,368 A | 12/2000 | Plutowski |
| 6,181,502 B1 | 1/2001 | Hussein et al. |
| 6,195,222 B1 | 2/2001 | Heminger et al. |
| 6,198,584 B1 | 3/2001 | Codilian et al. |
| 6,198,590 B1 | 3/2001 | Codilian et al. |
| 6,204,988 B1 | 3/2001 | Codilian et al. |
| 6,243,223 B1 | 6/2001 | Elliott et al. |
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |

(Continued)

OTHER PUBLICATIONS

Fan Hong, Chee K. Pang, "Robust vibration control at critical resonant modes using indirect-driven self-sensing actuation in mechatronic systems," ISA Transactions, Nov. 1, 2012, vol. 51, pp. 834-840, USA.

(Continued)

*Primary Examiner* — K. Wong

(57) ABSTRACT

A data storage device is disclosed comprising a voice coil motor (VCM) and a secondary actuator configured to actuate a head over a disk. A control signal is applied to the secondary actuator while processing a sensor signal generated by the secondary actuator. A vibration signal is generated based on the sensor signal, wherein the vibration signal is a high-pass signal.

39 Claims, 4 Drawing Sheets

(56) References Cited

U.S. PATENT DOCUMENTS

| | | |
|---|---|---|
| 6,574,062 B1 | 6/2003 | Bennett et al. |
| 6,577,465 B1 | 6/2003 | Bennett et al. |
| 6,600,619 B1 | 7/2003 | Morris et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,721,124 B2 * | 4/2004 | Chang .................. G11B 5/5556 360/77.07 |
| 6,724,563 B2 * | 4/2004 | Kobayashi ........... G11B 5/5552 360/77.02 |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,741,417 B2 * | 5/2004 | Hsin .................... G11B 5/5552 360/78.05 |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,411,752 B2 | 8/2008 | Angelo et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |

(56) References Cited

U.S. PATENT DOCUMENTS

| | | |
|---|---|---|
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,144,419 B1 | 3/2012 | Liu |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,446,687 B2 * | 5/2013 | Hironaka ............ G11B 5/5552 360/75 |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 8,922,937 B1 | 12/2014 | Chahwan et al. |
| 8,934,202 B2 | 1/2015 | Ramakrishnan et al. |
| 9,007,714 B1 | 4/2015 | Zheng et al. |
| 9,025,273 B1 | 5/2015 | Ferris et al. |
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |
| 2014/0139953 A1 | 5/2014 | Hatch |

OTHER PUBLICATIONS

F. Hong, A. M. Memon, W. E. Wong, C. K. Pang, "Indirect-driven self-sensing actuation for dual-stage HDDS with improved robustness," ASME Information Storage and Processing Systems Conference, Jun. 14-15, 2010, Santa Clara, CA, USA.

* cited by examiner

DATA STORAGE DEVICE CONCURRENTLY CONTROLLING AND SENSING A SECONDARY ACTUATOR FOR ACTUATING A HEAD OVER A DISK

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 1:
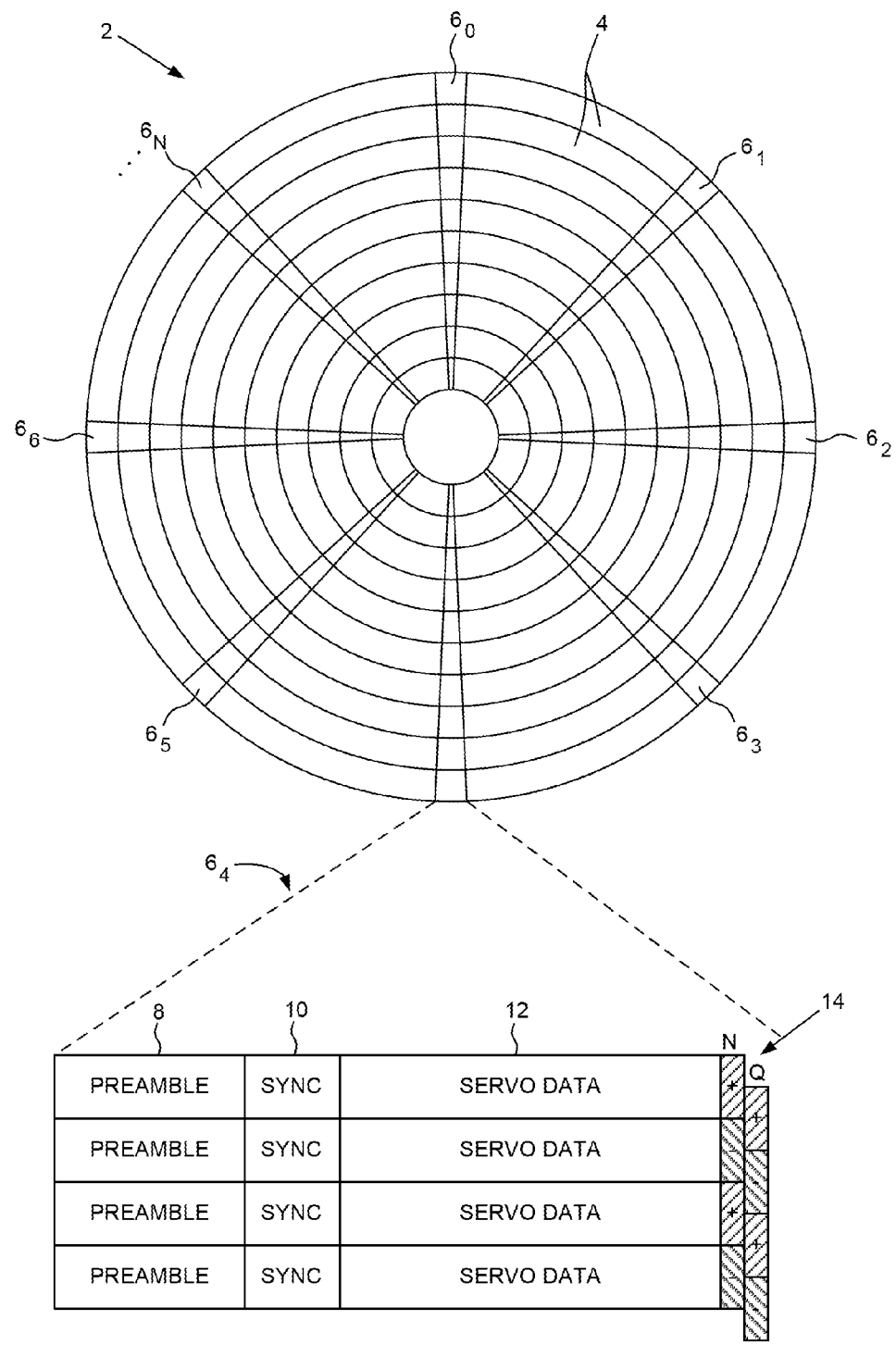
FIG. 1 shows a prior art disk format comprising a plurality of servo tracks defined by servo sectors.
Figure 2A:
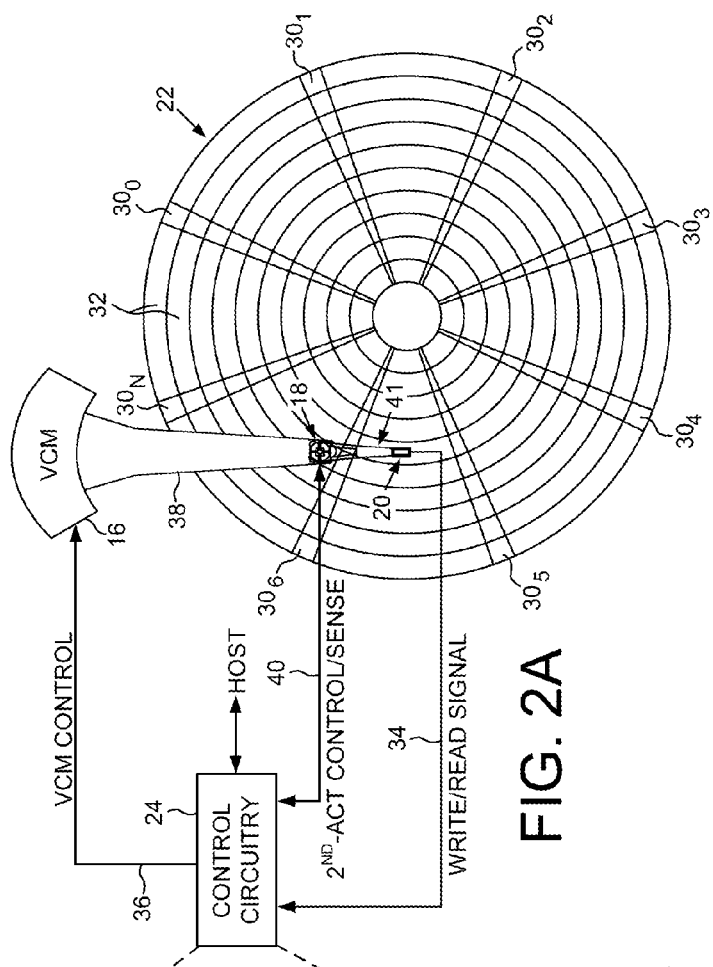
FIG. 2A shows a data storage device in the form of a disk drive according to an embodiment comprising a head actuated over a disk by a voice coil motor (VCM) and a secondary actuator.
Figure 2B:
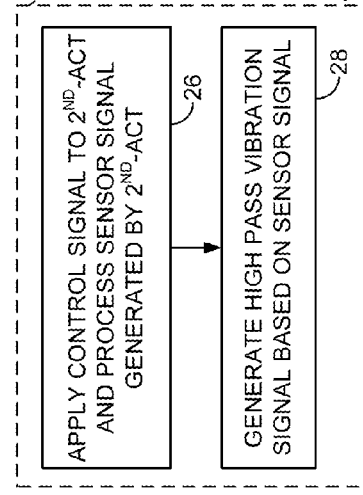
FIG. 2B is a flow diagram according to an embodiment wherein a control signal is applied to the secondary actuator while processing a sensor signal generated by the secondary actuator, wherein a high-pass vibration signal is generated based on the sensor signal.

FIG. 2A shows a data storage device in the form of a disk drive according to an embodiment comprising a voice coil motor (VCM) 16 and a secondary actuator 18 configured to actuate a head 20 over a disk 22. The disk drive further comprises control circuitry 24 configured to execute the flow diagram of FIG. 2B, wherein a control signal is applied to the secondary actuator while processing a sensor signal generated by the secondary actuator (block 26). A vibration signal is generated based on the sensor signal, wherein the vibration signal is a high-pass signal (block 28).

In the embodiment of FIG. 2A, the disk 22 comprises a plurality of servo sectors $30_0$-$30_N$ that define a plurality of servo tracks 32, wherein data tracks are defined relative to the servo tracks at the same or different radial density. The control circuitry 24 processes a read signal 34 emanating from the head 20 to demodulate the servo sectors $30_0$-$30_N$ and generate a position error signal (PES) representing an error between the actual position of the head and a target position relative to a target track. The control circuitry 24 filters the PES using a suitable compensation filter to generate a control signal 36 applied to the voice coil motor (VCM) 16 which rotates an actuator arm 38 about a pivot in order to actuate the head 20 radially over the disk 22 in a direction that reduces the PES. The control circuitry 24 also generates a control signal 40 applied to the secondary actuator 18 in order to actuate the head 20 over the disk 22 in fine movements. The servo sectors $30_0$-$30_N$ may comprise any suitable head position information, such as a track address for coarse positioning and servo bursts for fine positioning. The servo bursts may comprise any suitable pattern, such as an amplitude based servo pattern or a phase based servo pattern.

The secondary actuator 18 may comprise any suitable elements for actuating the head 20 over the disk 22, such as one or more piezoelectric elements. Further, the secondary actuator 18 may actuate the head 20 in any suitable manner, wherein in the example of FIG. 2A, the secondary actuator 18 actuates a suspension 41 about the distal end of the actuator arm 38. In other embodiments, the secondary actuator 18 may actuate the head 20 about the distal end of the suspension 41. In yet other embodiments, the secondary actuator may comprise multiple actuators, such as a milli-actuator configured to actuate the suspension 41 about the actuator arm 38, and a microactuator configured to actuate the head 20 about the suspension 41.

In one embodiment, the secondary actuator 18 may operate as a sensor for sensing vibrations affecting the disk drive. That is, a vibration may cause a rotational displacement of the actuator arm 38 which may induce an electrical response (sensor signal) in the secondary actuator 18. In one embodiment, the sensor signal may manifest on the same electrical lead used to apply the control signal 40 to the secondary actuator 18, and in other embodiments, there may be a dedicated lead coupled to the secondary actuator 18 for conducting the sensor signal. In one embodiment, the sensor signal may be processed to generate a vibration signal representing a vibration affecting the disk drive (magnitude and/or phase). The vibration signal may be used for any suitable purpose, such as for aborting a write operation to prevent an off-track write, or for generating a feed-forward control signal that compensates for the vibration in the servo control loop.

Figure 2C:
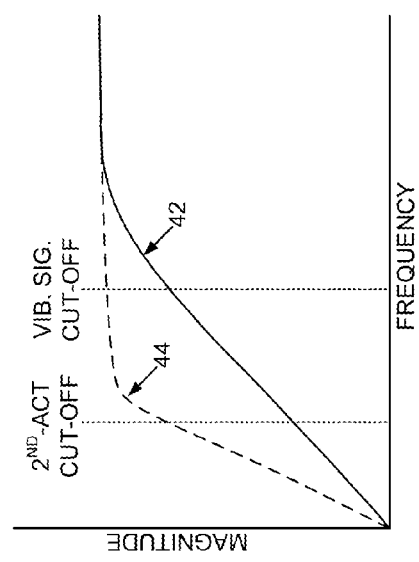
FIG. 2C shows an embodiment wherein the secondary actuator control loop has a high-pass response, and the vibration signal has a cut-off frequency above a cut-off frequency of the high-pass response of the secondary actuator.
Figure 5:
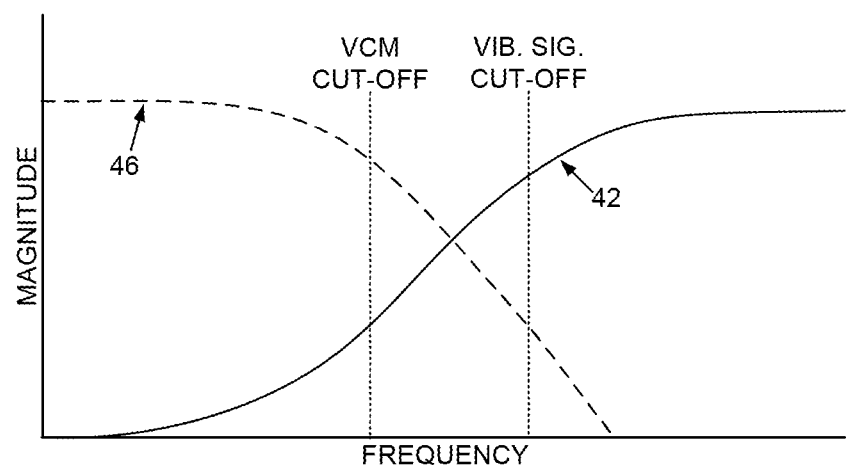
FIG. 5 shows an embodiment wherein the vibration signal has a cut-off frequency higher than a cut-off frequency of the VCM control loop.

FIG. 2C shows an embodiment wherein the vibration signal 42 generated based on the sensor signal 40 emanating from the secondary actuator 18 is a high pass signal meaning that the vibration signal 42 is responsive to higher frequency vibrations affecting the disk drive (above a cut-off frequency) with essentially no response at DC. In one embodiment, the vibration signal has a cut-off frequency between ten percent and ninety percent of a bandwidth of the control loop for controlling the secondary actuator 18. In another embodiment, the control loop for controlling the secondary actuator 18 has a high-pass response 44 such as shown in FIG. 2C, and the high-pass vibration signal has a cut-off frequency above a cut-off frequency of the high-pass response of the secondary actuator control loop. In yet another embodiment shown in FIG. 5, the high-pass vibration signal 42 has a cut-off frequency higher than a cut-off frequency of a response of the VCM control loop 46. In one embodiment, generating the high-pass vibration signal 42 above the response of the VCM control loop 46 helps attenuate cross-talk interference from the VCM control loop when using the vibration signal as feed-forward compensation for the secondary actuator control loop.

Figure 3:
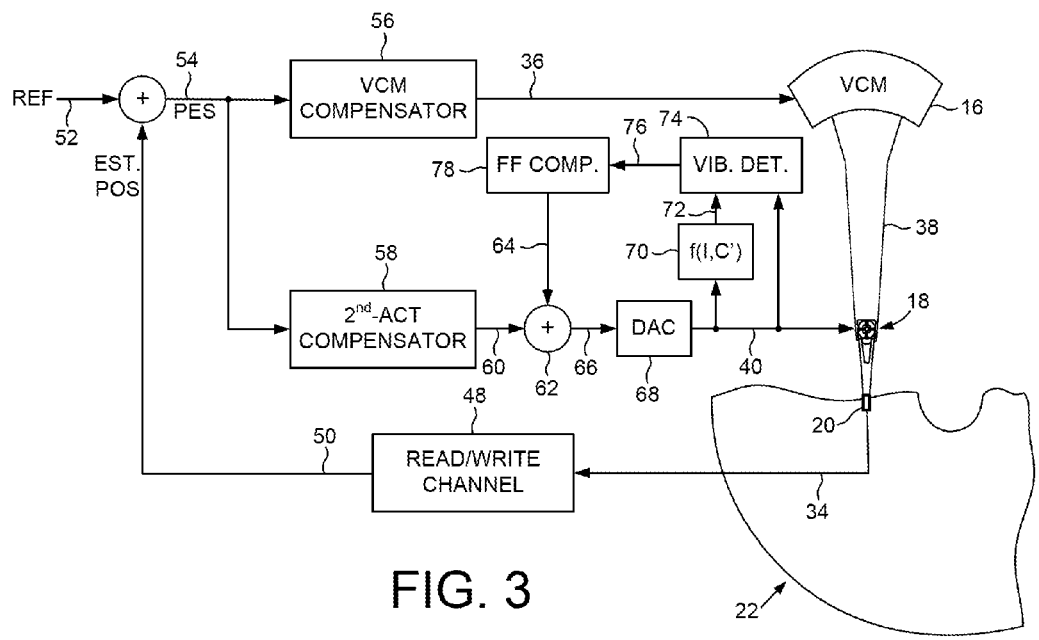
FIG. 3 shows control circuitry according to an embodiment wherein the vibration signal is generated based on a difference between the sensor signal and an estimated capacitive voltage of the secondary actuator.

FIG. 3 shows control circuitry according to an embodiment comprising a read/write channel 48 configured to process the read signal 34 emanating from the head 20 when reading the servo sectors. The read/write channel 48 demodulates the read signal 34 into a measured position 50 of the head 20 over the disk 22. The measured position 50 is subtracted from a reference position 52 to generate a position error signal (PES) 54. A VCM compensator 56 processes the PES 54 to generate the control signal 36 applied to the VCM 16, and a secondary actuator compensator 58 processes the PES 54 to generate the control signal 40 applied to the secondary actuator 18. In the embodiment of FIG. 3, the secondary actuator compensator 58 generates a digital control signal 60 that is adjusted at adder 62 by a feed-forward compensation signal 64. The resulting digital control signal 66 is converted into an analog control signal 40 by a digital-to-analog converter (DAC) 68. The analog control signal 40 is processed at block 70 to estimate a capacitive voltage 72 of the secondary actuator 18, and at block 74, a vibration signal 76 is generated based on the estimated capacitive voltage 72 and the analog control signal 40. Block 78 processes the vibration signal 76 to generate the feed-forward compensation signal 64, wherein block 78 may implement any suitable conversion algorithm to convert the vibration signal 76 (an acceleration signal) into a feed-forward control signal 64. In the embodiment of FIG. 3, the feed-forward control signal 64 compensates for the vibration by essentially anticipating the effect of the vibration on the PES 54 and controlling the position of the head 20 so as to follow the vibration.

Figure 4:
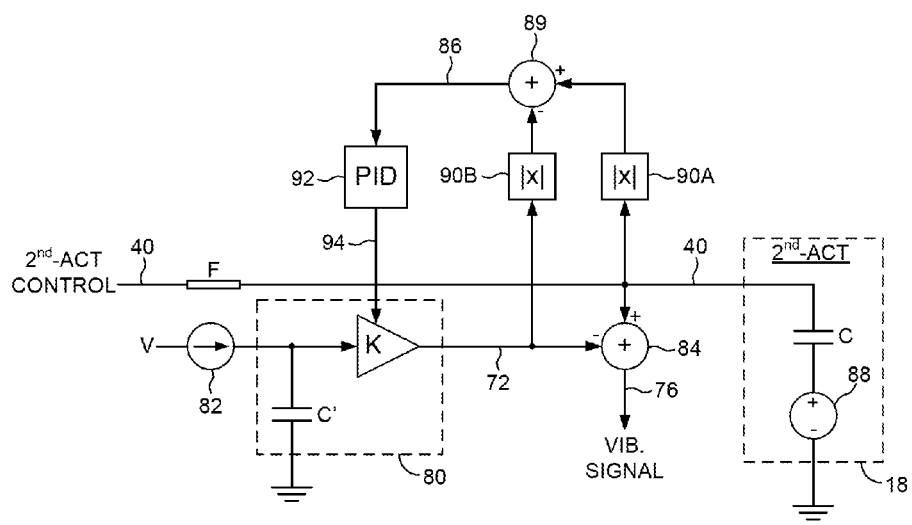
FIG. 4 shows control circuitry according to an embodiment wherein a gain of a sensor capacitor is adapted based on the sensor signal and the estimated capacitive voltage of the secondary actuator.

Any suitable control circuitry may be employed to implement blocks 70 and 74 in FIG. 3. FIG. 4 shows control circuitry according to an embodiment comprising a sensor capacitor 80 comprising a capacitance C' and a gain K that effectively estimate the capacitance C within the secondary actuator 18. The control circuitry of FIG. 4 further comprises a suitable current mirror F that generates a sensor current 82 proportional to a current applied to the secondary actuator 18 due to the control signal 40. An estimated capacitive voltage 72 of the secondary actuator 18 is generated by applying the sensor current 82 to the sensor capacitor 80, and the vibration signal 76 is generated at adder 84 based on a difference between the sensor signal 40 and the estimated capacitive voltage 72. This embodiment effectively cancels the voltage component in the sensor signal 40 due to the capacitance C of the secondary actuator 18 so that the vibration signal 76 represents mainly the voltage component 88 generated by the secondary actuator 18 due to the effect of the vibration on the disk drive.

In the embodiment of FIG. 4, the control circuitry adapts the gain K of the sensor capacitor 80 based on the sensor signal 40 and the estimated capacitive voltage 72. In one embodiment, a difference signal 86 is generated at adder 89 based on a difference between the absolute value (block 90A) of the control signal 40 and the absolute value (block 90B) of the estimated capacitive voltage 72. In the embodiment of FIG. 4, the control circuitry comprises a proportional-integral-derivative (PID) compensator 92 that low pass filters the difference signal 86 to generate a low-pass signal 94, and adapts the gain K of the sensor capacitor 80 based on the low-pass signal 94. In this manner, the gain K of the sensor capacitor 80 is adapted substantially based on the control signal generated by the secondary actuator compensator 58 rather than on the sensor signal 40 due to the response of the secondary actuator 18 to vibrations. In one embodiment, the gain K is adapted until the low-pass signal 94 is substantially zero wherein the capacitance of the sensor capacitor 80 will substantially match the capacitance C of the secondary actuator 18.

In one embodiment, the ratio of the current mirror F and the gain K are selected to enable the capacitance C' of the sensor capacitor 80 to be significantly less than the capacitance C of the secondary actuator 18 (e.g., two times less). In this manner, the capacitor C' in the sensor capacitor 80 may be fabricated as part of an integrated circuit rather than implemented as a more expensive external capacitor. For example, if the capacitor C' is fabricated to be approximately two times smaller than the capacitor C of the secondary actuator 18, the current mirror F may be fabricated with an approximately unitary ratio and the gain K adapted to approximately two. In other embodiments, the ratio of the current mirror F and/or the gain K may be selected so that the capacitor C' of the sensor capacitor 80 may be larger than the capacitor C of the secondary actuator 18.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In other embodiments, the control circuitry may be implemented within a suitable preamp circuit, within a power large scale integrated (PLSI) circuit, or within a stand-alone integrated circuit.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on.

In yet another embodiment, the control circuitry comprises suitable logic circuitry, such as state machine circuitry. In some embodiments, the control circuitry may comprise suitable conversion circuitry so that at least some of the operations are implemented in the digital domain, and in other embodiments at least some of the operations are implemented in the analog domain.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
    a disk;
    a head;
    a voice coil motor (VCM) and a secondary actuator configured to actuate the head over the disk;
    a sensor capacitor proportional to a capacitance of the secondary actuator; and
    control circuitry configured to:
        apply a control signal to the secondary actuator and concurrently process a sensor signal generated by the secondary actuator; and
        generate a vibration signal based on the sensor signal and the sensor capacitor, wherein a capacitance of the sensor capacitor is at least two times less than a capacitance of the secondary actuator.

2. The data storage device as recited in claim 1, wherein the vibration signal has a cut-off frequency between ten percent and ninety percent of a bandwidth of a control loop for controlling the secondary actuator.

3. The data storage device as recited in claim 1, wherein:
    a control loop for controlling the secondary actuator has a high-pass response; and
    the vibration signal has a cut-off frequency above a cut-off frequency of the high-pass response of the control loop for the secondary actuator.

4. The data storage device as recited in claim 1, wherein the vibration signal has a cut-off frequency higher than a cut-off frequency of a response of a control loop for controlling the VCM.

5. The data storage device as recited in claim 1, wherein the control circuitry is further configured to:
    generate a sensor current proportional to a current applied to the secondary actuator due to the control signal;
    estimate a capacitive voltage of the secondary actuator based on the sensor current; and
    generate the vibration signal based on a difference between the sensor signal and the estimated capacitive voltage.

6. The data storage device as recited in claim 5, wherein the control circuitry is further configured to estimate the capacitive voltage of the secondary actuator by applying the sensor current to the sensor capacitor.

7. The data storage device as recited in claim 6, wherein the control circuitry is further configured to adapt a gain of the sensor capacitor based on the sensor signal and the estimated capacitive voltage.

8. The data storage device as recited in claim 7, wherein the control circuitry is further configured to:
    low pass filter a difference between the sensor signal and the estimated capacitive voltage to generate a low-pass signal; and
    adapt the gain of the sensor capacitor based on the low-pass signal.

9. The data storage device as recited in claim 1, wherein the control circuitry is further configured to generate a feed-forward compensation signal applied to the secondary actuator based on the vibration signal.

10. A data storage device comprising:
    a disk;
    a head;
    a voice coil motor (VCM) and a secondary actuator configured to actuate the head over the disk; and
    control circuitry configured to:
        measure a position of the head over the disk;
        generate a control signal based on the measured position of the head;
        apply the control signal to the secondary actuator;
        process a sensor signal generated by the secondary actuator;
        generate a sensor current proportional to a current applied to the secondary actuator due to the control signal;
        estimate a capacitive voltage of the secondary actuator by applying the sensor current to a sensor capacitor that is proportional to a capacitance of the secondary actuator;
        generate a vibration signal based on a difference between the sensor signal and the estimated capacitive voltage; and
        adapt a gain of the sensor capacitor based on the control signal and the estimated capacitive voltage.

11. The data storage device as recited in claim 10, wherein the control circuitry is further configured to:

low pass filter a difference between the sensor signal and the estimated capacitive voltage to generate a low-pass signal; and
adapt the gain of the sensor capacitor based on the low-pass signal.

12. The data storage device as recited in claim 10, wherein a capacitance of the sensor capacitor is at least two times less than the capacitance of the secondary actuator.

13. The data storage device as recited in claim 10, wherein the control circuitry is further configured to generate a feed-forward compensation signal applied to the secondary actuator based on the vibration signal.

14. A method of operating a data storage device, the method comprising:
actuating a head over a disk using a voice coil motor (VCM) and a secondary actuator;
applying a control signal to the secondary actuator and concurrently process a sensor signal generated by the secondary actuator; and
generating a vibration signal based on the sensor signal, wherein the vibration signal has a cut-off frequency between ten percent and ninety percent of a bandwidth of a control loop for controlling the secondary actuator.

15. The method as recited in claim 14, wherein:
the control loop for controlling the secondary actuator has a high-pass response; and
the vibration signal has a cut-off frequency above a cut-off frequency of the high-pass response of the control loop for the secondary actuator.

16. The method as recited in claim 14, wherein the vibration signal has a cut-off frequency higher than a cut-off frequency of a response of a control loop for controlling the VCM.

17. The method as recited in claim 14, further comprising:
generating a sensor current proportional to a current applied to the secondary actuator due to the control signal;
estimating a capacitive voltage of the secondary actuator based on the sensor current; and
generating the vibration signal based on a difference between the sensor signal and the estimated capacitive voltage.

18. The method as recited in claim 17, further comprising estimating the capacitive voltage of the secondary actuator by applying the sensor current to a sensor capacitor that is proportional to a capacitance of the secondary actuator.

19. The method as recited in claim 18, further comprising adapting a gain of the sensor capacitor based on the sensor signal and the estimated capacitive voltage.

20. The method as recited in claim 19, further comprising:
low pass filtering a difference between the sensor signal and the estimated capacitive voltage to generate a low-pass signal; and
adapting the gain of the sensor capacitor based on the low-pass signal.

21. The method as recited in claim 18, wherein a capacitance of the sensor capacitor is at least two times less than the capacitance of the secondary actuator.

22. The method as recited in claim 14, further comprising generating a feed-forward compensation signal applied to the secondary actuator based on the vibration signal.

23. A method of operating a data storage device, the method comprising:
actuating a head over a disk using a voice coil motor (VCM) and a secondary actuator;
measuring a position of the head over the disk;
generating a control signal based on the measured position of the head;
applying the control signal to a secondary actuator configured to actuate the head over the disk;
processing a sensor signal generated by the secondary actuator;
generating a sensor current proportional to a current applied to the secondary actuator due to the control signal;
estimating a capacitive voltage of the secondary actuator by applying the sensor current to a sensor capacitor that is proportional to a capacitance of the secondary actuator;
generating a vibration signal based on a difference between the sensor signal and the estimated capacitive voltage; and
adapting a gain of the sensor capacitor based on the control signal and the estimated capacitive voltage.

24. The method as recited in claim 23, further comprising:
low pass filtering a difference between the sensor signal and the estimated capacitive voltage to generate a low-pass signal; and
adapting the gain of the sensor capacitor based on the low-pass signal.

25. The method as recited in claim 23, wherein a capacitance of the sensor capacitor is at least two times less than the capacitance of the secondary actuator.

26. The method as recited in claim 23, further comprising generating a feed-forward compensation signal applied to the secondary actuator based on the vibration signal.

27. Control circuitry configured to control a voice coil motor (VCM) and a secondary actuator to actuate a head over a disk, the control circuitry configured to:
apply a control signal to the secondary actuator and concurrently process a sensor signal generated by the secondary actuator; and
generate a vibration signal based on the sensor signal, wherein the vibration signal has a cut-off frequency between ten percent and ninety percent of a bandwidth of a control loop for controlling the secondary actuator.

28. The control circuitry as recited in claim 27, wherein:
the control loop for controlling the secondary actuator has a high-pass response; and
the vibration signal has a cut-off frequency above a cut-off frequency of the high-pass response of the secondary actuator.

29. The control circuitry as recited in claim 27, wherein the vibration signal has a cut-off frequency higher than a cut-off frequency of a response of a control loop for controlling the VCM.

30. The control circuitry as recited in claim 27, wherein the control circuitry is further configured to:
generate a sensor current proportional to a current applied to the secondary actuator due to the control signal;
estimate a capacitive voltage of the secondary actuator based on the sensor current; and
generate the vibration signal based on a difference between the sensor signal and the estimated capacitive voltage.

31. The control circuitry as recited in claim 30, wherein the control circuitry is further configured to estimate the capacitive voltage of the secondary actuator by applying the sensor current to a sensor capacitor that is proportional to a capacitance of the secondary actuator.

32. The control circuitry as recited in claim 31, wherein the control circuitry is further configured to adapt a gain of the sensor capacitor based on the sensor signal and the estimated capacitive voltage.

33. The control circuitry as recited in claim 32, wherein the control circuitry is further configured to:
  low pass filter a difference between the sensor signal and the estimated capacitive voltage to generate a low-pass signal; and
  adapt the gain of the sensor capacitor based on the low-pass signal.

34. The control circuitry as recited in claim 31, wherein a capacitance of the sensor capacitor is at least two times less than the capacitance of the secondary actuator.

35. The control circuitry as recited in claim 27, wherein the control circuitry is further configured to generate a feed-forward compensation signal applied to the secondary actuator based on the vibration signal.

36. Control circuitry configured to control a voice coil motor (VCM) and a secondary actuator to actuate a head over a disk, the control circuitry configured to:
  measure a position of the head over the disk;
  generate a control signal based on the measured position of the head;
  apply the control signal to the secondary actuator;
  process a sensor signal generated by the secondary actuator;
  generate a sensor current proportional to a current applied to the secondary actuator due to the control signal;
  estimate a capacitive voltage of the secondary actuator by applying the sensor current to a sensor capacitor that is proportional to a capacitance of the secondary actuator;
  generate a vibration signal based on a difference between the sensor signal and the estimated capacitive voltage; and
  adapt a gain of the sensor capacitor based on the control signal and the estimated capacitive voltage.

37. The control circuitry as recited in claim 36, wherein the control circuitry is further configured to:
  low pass filter a difference between the sensor signal and the estimated capacitive voltage to generate a low-pass signal; and
  adapt the gain of the sensor capacitor based on the low-pass signal.

38. The control circuitry as recited in claim 36, wherein a capacitance of the sensor capacitor is at least two times less than the capacitance of the secondary actuator.

39. The control circuitry as recited in claim 36, wherein the control circuitry is further configured to generate a feed-forward compensation signal applied to the secondary actuator based on the vibration signal.

* * * * *